(12) United States Patent
Rimai et al.

(10) Patent No.: US 8,937,702 B2
(45) Date of Patent: *Jan. 20, 2015

(54) METHOD OF MAKING A PANORAMIC PRINT

(71) Applicant: Eastman Kodak Company, Rochester, NY (US)

(72) Inventors: Donald S. Rimai, Webster, NY (US); Gary P. Lawniczak, Rochester, NY (US); Nelson A. Blish, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 276 days.

This patent is subject to a terminal disclaimer.

(21) Appl. No.: 13/663,914

(22) Filed: Oct. 30, 2012

(65) Prior Publication Data

US 2014/0118700 A1 May 1, 2014

(51) Int. Cl.
G06K 19/06 (2006.01)
G06K 15/00 (2006.01)
G06K 1/00 (2006.01)
H04N 1/60 (2006.01)
H04N 5/232 (2006.01)

(52) U.S. Cl.
USPC ............... 352/69; 348/38; 348/36; 358/1.1; 396/322; 396/335

(58) Field of Classification Search
USPC ........... 352/69, 70; 396/322, 335; 348/38, 36; 358/1.1
See application file for complete search history.

(56) References Cited

U.S. PATENT DOCUMENTS

| 5,289,229 | A | | 2/1994 | Manico | |
|---|---|---|---|---|---|
| 5,486,895 | A | * | 1/1996 | Leidig et al. | 355/50 |
| 5,502,541 | A | | 3/1996 | Olliver | |
| 6,038,977 | A | | 3/2000 | Haney | |
| 6,314,192 | B1 | * | 11/2001 | Chen et al. | 382/100 |
| 6,394,669 | B1 | * | 5/2002 | Janosky et al. | 396/571 |
| 7,705,908 | B2 | | 4/2010 | Fredlund et al. | |
| 8,836,998 | B2 | * | 9/2014 | Rimai et al. | 358/1.9 |
| 2007/0273767 | A1 | | 11/2007 | Kim | |
| 2013/0236055 | A1 | * | 9/2013 | Miyamoto et al. | 382/103 |
| 2013/0250044 | A1 | * | 9/2013 | Miyamoto et al. | 348/36 |
| 2014/0118480 | A1 | * | 5/2014 | Rimai et al. | 348/36 |
| 2014/0118481 | A1 | * | 5/2014 | Rimai et al. | 348/36 |

* cited by examiner

*Primary Examiner* — William C Dowling

(74) *Attorney, Agent, or Firm* — Nelson Adrian Blish

(57) ABSTRACT

A method of making a panoramic image includes capturing a first image (30) defining a first overlap region (115) capturing a second image (40), and defining a second overlap region (215). Two points (150, 151) in the first overlap region are identified and a first vector (175) overlap region connecting the two points is defined. Two points (250, 251) in the second overlap region which correspond to the two points in the first overlap region are identified and a second vector (275) the two points is defined. If points in the first vector match points in the second vector, determine if the first and second vectors are parallel. If the vectors are not parallel, rotate the second vector image until the second vector is parallel to the first vector.

6 Claims, 9 Drawing Sheets

METHOD OF MAKING A PANORAMIC PRINT

CROSS REFERENCE TO RELATED APPLICATIONS

Reference is made to commonly-assigned U.S. patent application Ser. No. 13/663,882 (now U.S. Pat. No. 8,836,998), filed Oct. 30, 2012, entitled METHOD OF PRINTING A PANORAMIC PRINT, by Rimai et al.; U.S. patent application Ser. No. 13/663,898 (now U.S. Publication No. 2014/0118480), filed Oct. 30, 2012, entitled SYSTEM FOR MAKING A PANORAMIC IMAGE; by Rimai et al.; and U.S. patent application Ser. No. 13/663,927 (now U.S. Publication No. 2014/0118481), filed Oct. 30, 2012, entitled SYSTEM FOR MAKING A PANORAMIC PRINT, by Rimai et al.; the disclosures of which are incorporated herein.

FIELD OF THE INVENTION

This invention relates to a method of producing a panoramic print from a plurality of digital image files. In particular, this invention describes a method of printing a panoramic print made from a plurality of digital image files captured using a digital camera.

BACKGROUND OF THE INVENTION

The printing of pictures captured using a digital camera on a digital printer such as an electrophotographic or inkjet printer is well known. Photographers have, for decades, made enlargements of photographs or panoramic prints. In U.S. Pat. No. 5,289,229 (Manico) discloses an apparatus for printing full frame or panoramic prints from negatives from a roll of film. Manico teaches measuring the density at a multitude of points on the negative to determine if the print is to be a full frame or a panoramic print. In U.S. Pat. No. 5,502,541 (Olliver) teaches the use of a printer to distinguish between full frame prints and panoramic prints interspersed with the full frame prints on a strip of film. U.S. Pat. No. 6,038,977 (Haney) teaches the use of a template to align prints. U.S. Pat. No. 6,246,413 (Teo) teaches a method of producing a panoramic print whereby the image of a panoramic scene is altered to allow it to be mapped to a surface. U.S. Pat. No. 7,705,908 (Fredlund et al.) teach a camera operating parameter to compare images in a camera to determine common elements. U.S. Publication No. 2007/0273767 (Kim) teaches a method of producing a panoramic print from a mobile device such as a cell phone by creating a markup document.

Producing panoramic prints using professional equipment is a relatively straight forward process. Cameras are mounted to a mounting system that fixes the orientation of the camera along both the horizontal or X-direction and the vertical or Y-direction. After capturing a first view to form a digital file of the first view, the camera is precisely rotated to capture a second view with a controlled or known amount of overlap between the first and second view. When printing the views to form a panoramic print, the precision of the views allows printing without having to perform complicated adjustments for image overlap. Thus, a first and second electronic file corresponding to the digital information corresponding to the first and second view can be directly inputted into a printer to produce the panoramic print. Additional views can also be captured to create a larger panoramic view. The files must also be suitable scaled to allow prints to be produced on receivers such as paper of a selected size.

Producing panoramic prints from views and digital files captured using consumer grade cameras is more problematic. Specific issues include 1) the cameras are often hand held and 2) even if a mounting system such as a tripod is used to stabilize the camera, the mounting systems does not have any means to precisely change the orientation of the camera. As a result, the captured views and the digital files resulting from the captured views can have variable regions of overlap between the captured views. In addition, the ability to maintain the precise horizontal positioning of the camera is limited. Thus, there may be relative tilting between the first and second views captured by a consumer grade digital camera. If more than two views are captured to create a panoramic print, these problems are compounded. Finally, the size of the panoramic print must be adjusted, according to the size of the paper available and the desires of the operator, to produce a panoramic print of the desired size. It should be noted that the final panoramic print may be printed on multiple sheets of receiver and that final scaling must be done to allow the displayed print to have a consistent border and not have undesirable projections or absences of printed views on the final print.

A method is needed to combine digital files from a simple image or view capture device to produce an electronic file corresponding to a panoramic image. A method is also needed to allow digital files capturing views or images on a simple image capture device to be combines so that they can be printed on a printer to produce a panoramic print.

SUMMARY OF THE INVENTION

Briefly, according to one aspect of the present invention a method of making a panoramic print includes capturing a first image; defining a first overlap region adjacent a first edge of the first image; capturing a second image; defining a second overlap region adjacent to a first edge of the second image; identifying at least two points in an area containing variable image content in the first overlap region; extracting information from each of the two points in the first overlap region; defining a first vector in the first overlap region connecting the two points in the first overlap region; locating two points in the second overlap region which correspond to the two points in the first overlap region; defining a second vector in the second overlap region connecting the two points in the second overlap region; determining if a first plurality of points in the first vector matches a second plurality of points in the second vector; if the first plurality of points in the first vector matches the second plurality of points in the second vector, determine if the first and second vectors are parallel; if the first and second vectors are not parallel, determine an angle of rotation required to make the second vector parallel to the first vector; adjusting a speed of an image writer so that the first and second vector are parallel in the print; and printing the panoramic image.

DETAILED DESCRIPTION OF THE INVENTION

Figure 1:
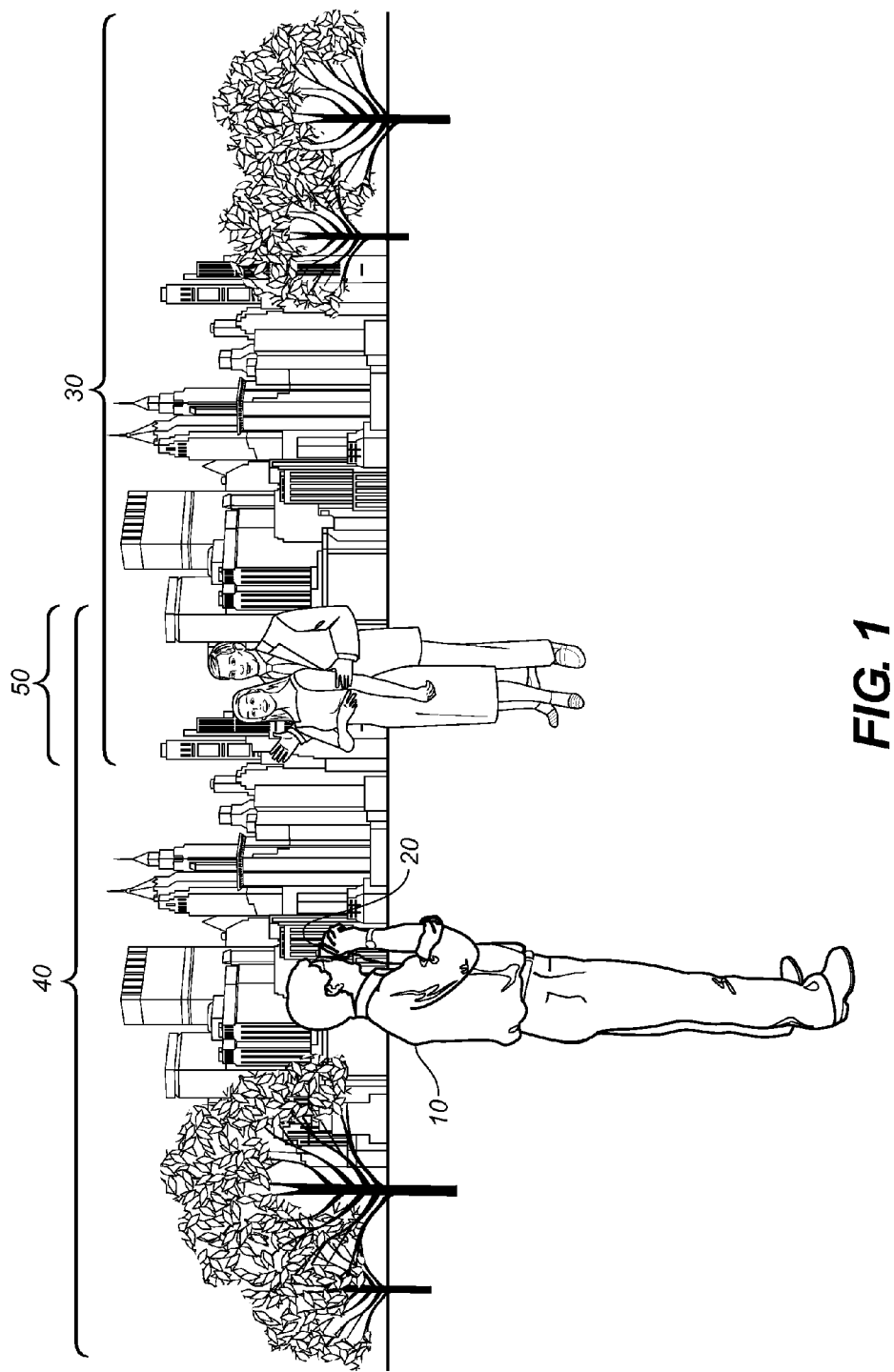
FIG. 1 shows a photographer capturing two adjacent images that will be combined to form a panoramic image or print using a digital camera.

The present invention will be directed in particular to elements forming part of, or in cooperation more directly with the apparatus in accordance with the present invention. It is to be understood that elements not specifically shown or described may take various forms well known to those skilled in the art.

This invention describes a method of producing a panoramic print made using multiple sheets of a receiver material such as paper. The panoramic print may be produced from a single electronic file wherein portions of the file must be stitched together in a seamless fashion to create a print that is too large to be printed on a single piece of a receiver of a size that can be utilized in the digital printer that is making the panoramic print. More often, the panoramic print is made from a series of electronic files, for example, files corresponding to digital pictures captured with a digital camera and uploaded to a computer. The computer converts the digital files into printable files and sends them to a printer to be printed. The digital pictures are generally captured with either a hand held camera or a camera mounted on a tripod. The photographer using the camera will manually rotate the camera in either the horizontal or vertical directions to capture the entire scene in a series of digital camera files. The typical method of capturing pictures by amateur photographers precludes the ability to precisely orient the camera to collect only that data not contained in another file without special features incorporated in the camera, features that are generally not available to the casual photographer using a typical digital camera available to the public.

The panoramic print may consist of individual sheets each of which contains a print made from a specific digital file. Alternatively, each print may contain printed information from more than one file or may contain printed information from less than one digital file. This, for example, can depend on the magnification used when printing the panoramic print.

The size of the individual print and the printed file may or may not be commensurate. In some instances, the digital file may fit exactly into the region of the receiver onto which the digital file is to be printed. The regions to be printed may extend to the one or more edges of the receiver. Alternatively, the receiver may contain unprinted regions of finite extend that allow individual sheets to be overlapped and bonded together so that the panoramic print will encompass multiple individual sheets that have been bound into one coherent member with the portion printed on one sheet adjoining in a continuous manner the portion printed on an adjacent sheet. Alternatively, a print made from a digital file can be exactly commensurate with the receiver sheet onto which it is being printed. This is desirable when the panoramic print is going to be attached to a supporting member such as a wall, billboard, ceiling, floor, or other large panel designed to support the receiver sheets.

It is also possible that the receiver sheets and individual files may not be commensurate. For example, the area of the supporting member to be covered with the panoramic print may require a magnification that would make the sheets available for use in the specific printer being used to print the receiver sheets incommensurate with the magnification required to exactly print a digital file onto an individual receiver sheet.

In the practice of the present invention, a photographer captures a plurality of digital files corresponding to a plurality of views to be formed into a panoramic print. The capture can be done using a digital camera. Conversely, conventional silver halide cameras can be used when practicing this invention. If using the latter, the captured views must first be converted into digital files by known methods such as scanning Each view of the plurality of views contains overlap regions with the adjacent view. Adjacent views can be offset from the first view by a displacement along either the horizontal or X- direction or the vertical or Y-direction.

FIG. 1 shows a photographer 10 using a hand held digital camera 20 to capture digital files corresponding to two adjacent views that will combined to form a digital file or a print of panoramic image whereby the two adjacent views are combined to produce a single panoramic image.

The photographer first takes a picture of view 30 and subsequently takes a picture of view 40, whereby the each of the two views contain an overlap region 50. The views are used to produce digital files of the two images 100 and 200 with overlap regions 115 and 215 shown in FIG. 2.

Figure 3A:
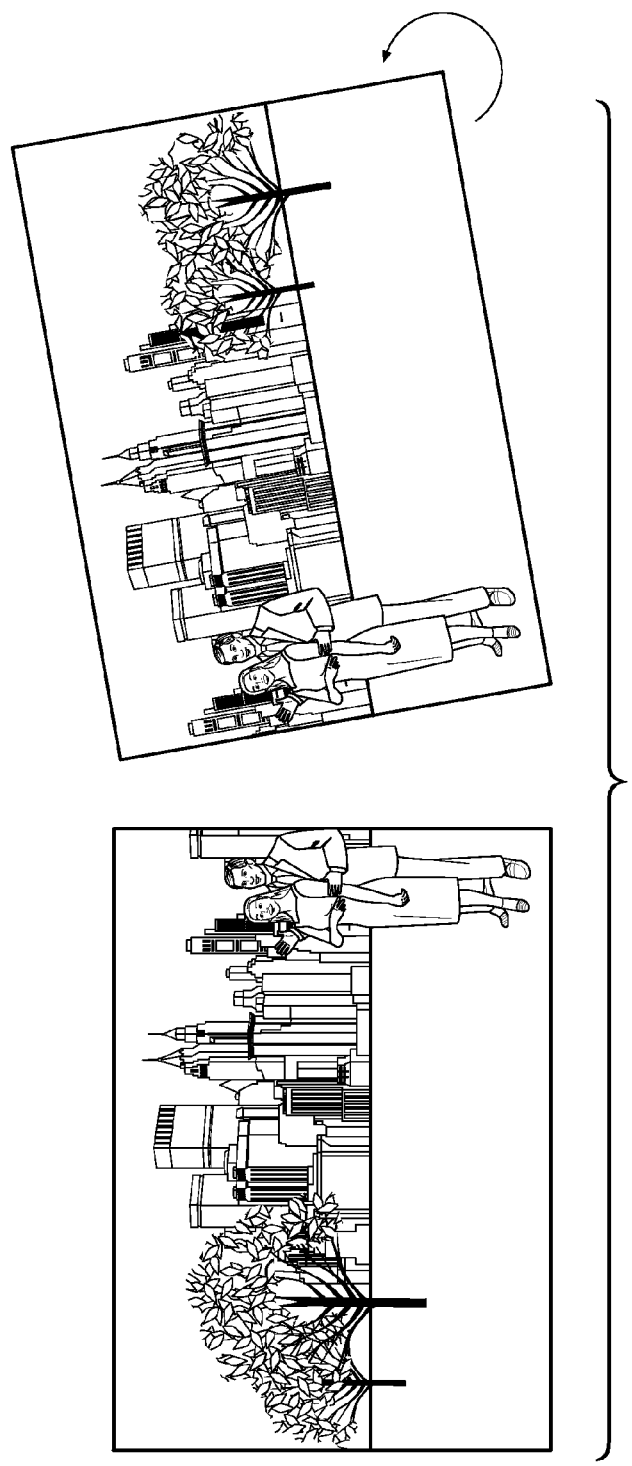
FIGS. 3A and 3B show images resulting from misalignment of the digital camera.
Figure 3B:
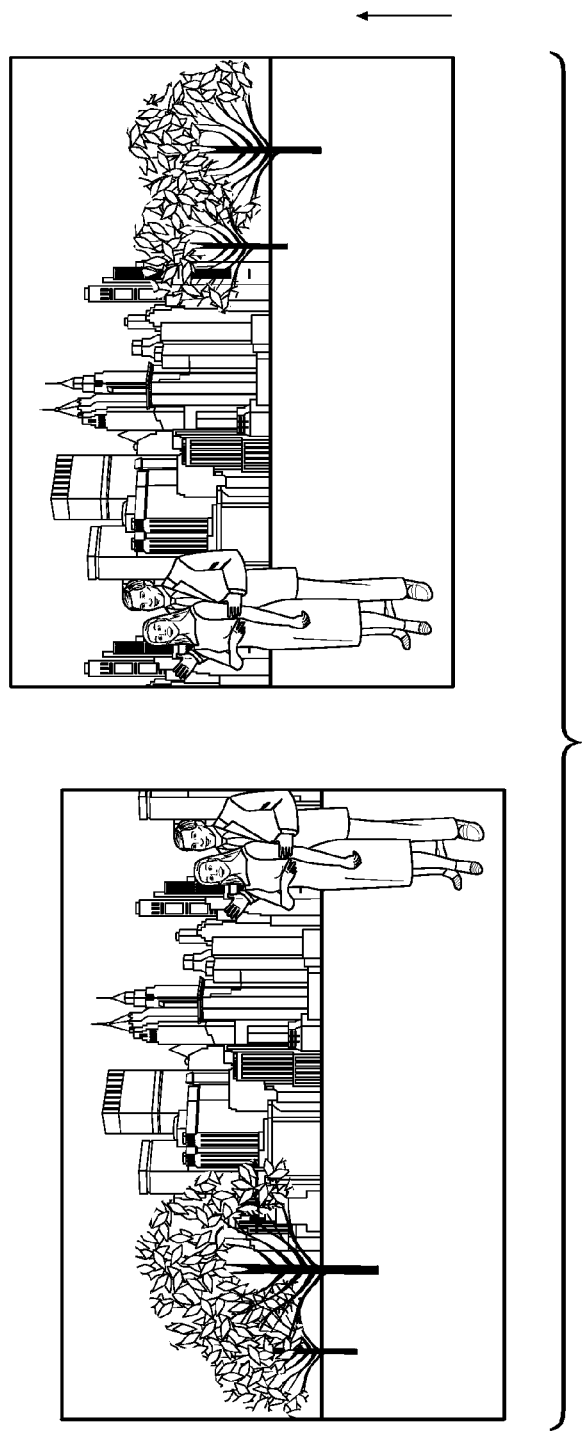

Due to the imprecise method of holding and positioning the camera, the digital files may not be precisely oriented with respect to each other. For example, one image may be rotated with respect to the other. See FIG. 3A. Alternatively, the elevation of the camera may be different resulting in a translation offset of the digital files 100 and 200 shown in FIG. 3B. The photographer may have also altered his position or the magnification of the image, resulting in the two images not corresponding to the same size of the object being photographed.

Moreover, external circumstances can change the contrast of the two digital files. For example, during the period between the capture of digital file 100 and digital file 200, clouds may have moved in, changing the lighting. Digital file may have been created at a later time in the day, resulting in different image densities or contrast. To produce an acceptable panoramic image or print, these factors must be taken into account and proper adjustments made.

One method of practicing the present invention describes a process for combining separate digital files that captured abutting scenes or views to produce a digital file corresponding to a panoramic view or scene that can be either printed or displayed electronically. In an alternative method of practicing the present invention, the digital files corresponding to the abutting views or scenes are not combined into a single file. Instead, the digital files are printed on a digital printer such as an electrophotographic or an inkjet printer, whereby corrections based on information contained in the digital files is used to correct the formation of the print by the digital printer.

Figure 2:
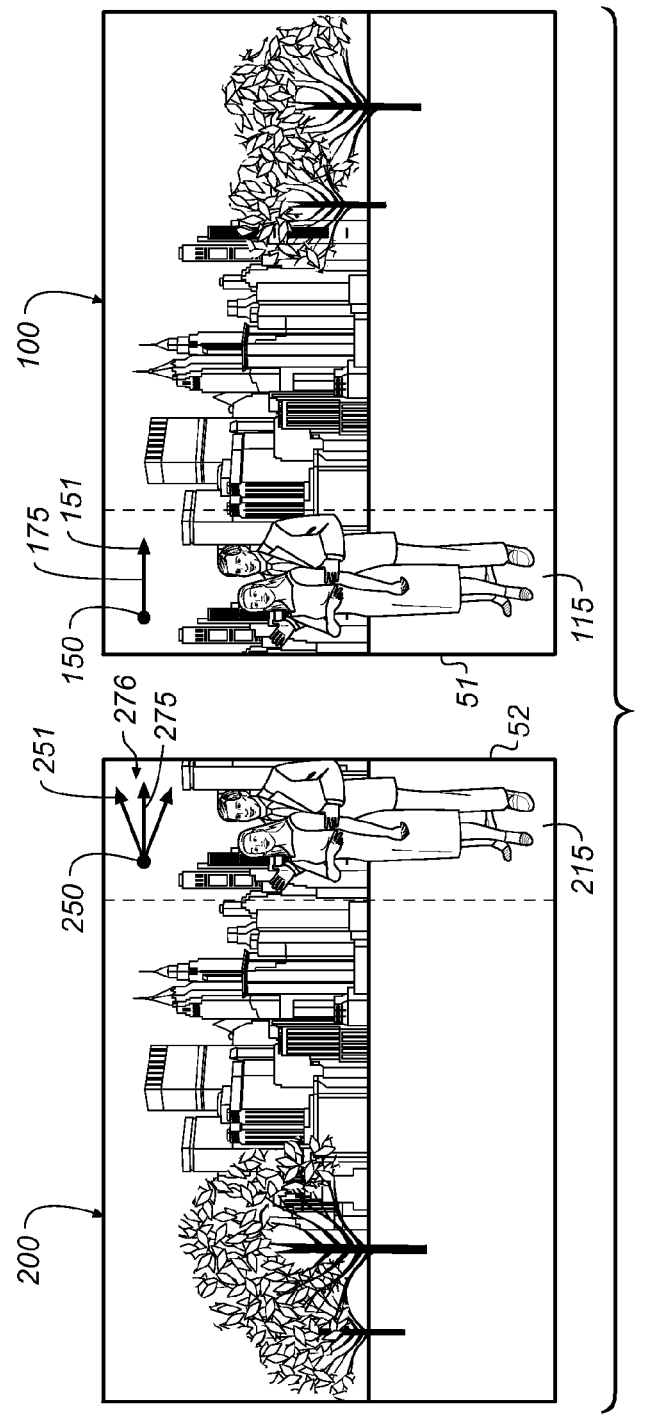
FIG. 2 shows captured first and second images.

According to one embodiment of the invention, a first and a second image of a scene comprising what will be combined into a panoramic image that is to be printed to form a panoramic print are captured. The device for capturing the first and second views, e.g. a digital camera, can be hand held or mounted on stand such as a tripod. The first and the second views contain scenes that abut one another, with a corresponding left and right boundary region in each that will form an overlap region so that, for a portion of each view, the information captured is the same. FIG. 2 shows first view 100 and second view 200, with overlap region 115 in the first image 100 and overlap region in the second view 200.

The first and second images are either captured as digital data files or converted into digital data files from printed photographs. The data in the digital files can be converted into functions such as 2-dimensional Taylor, McLauren, or Fourier series as this may facilitate processing the data for the purpose of practicing this invention. A reference point 150 is selected in overlap region 115 and a vector 175, preferably parallel to the X-axis, emanating from the reference point is created relating the information contained in the digital data file of the first view. The reference data can contain density data or, in the case of a color view, information corresponding to the cyan, magenta, yellow, and black separations. The vector relates the color and density information in the overlap region 115 to the position of each data point within the vector in the overlap region 115.

A reference point 250 in the second view overlap region 215 corresponding to the image information at a point of the reference vector 175 is then selected and a family of reference vectors 276 through a reference point with the overlap region 215 is created, wherein the family of reference vectors 276 each have the same length, but differ in orientation. The data in reference vector 175 is compared to that in each vector of the family of reference vectors 276. If the data in a vector 275 in the family of reference vectors 276 matches the data, point by point, in the reference vector 175 it is selected.

If the data in reference vector 275 does not match the data in reference vector 175, a new reference point is chosen and a family of reference vectors 276 is drawn and the above described process is repeated. Alternatively, if a reference vector 275 is found to match the reference vector 175, it is determined that the precise overlap of overlap regions 115 and 215 has been determined.

In an alternate embodiment, two reference points 150, 151 in the first image are selected and a vector established. Two matching reference points 250, 251 in the second image are selected and a second vector is established. If the data in the vectors do not match, a second reference point 251 is chosen in an iterative process until matching vectors are established.

Figure 4:
FIG. 4 shows the merged overlap region.

Referring to FIG. 4, once reference vector 275 is found that matches reference vector 175, the direction angle 300 between vector 175 and 275 is determined. Direction angle 300 is the angle that the data in the electronic file corresponding to view 200 will have to be rotated so that it is parallel to reference vector 175. Once the direction angle 300 has been determined, the amount that vector 275 must be translated in the X and Y directions to properly align the views upon printing. Finally, if necessary, the length of rotated reference vector 276 can be adjusted of necessary so that rotated reference vectors 175 and 276 have the same length, as might occur if, for example, the focus or telescopic adjustments were made during the capture of view 200. By making these corrections, the electronic files corresponding to views 100 and 200 are made to abut, with an overlap region on each that is superimposable.

Once the electronic files have been made to abut, a panoramic print can be made. The panoramic print is most conveniently printed using a digital print engine such as an electrophotographic print engine or an inkjet print engine. In an electrophotographic print engine, a primary imaging member such as a photoreceptor is initially uniformly electrically charged. An electrostatic latent image is formed on the photoreceptor by mage-wise exposing the primary imaging member to light using a device such as a laser scanner or LED array. The electrostatic latent image bearing primary imaging member is brought into operative proximity to a development station that deposits electrostatically charged marking particles, commonly known as toner particles, onto the primary imaging member to convert the electrostatic latent image into a visible image. The toner image is then brought into contact with a receiver such as paper and the toner image is transferred to the receiver. Subsequently, the toner image is fixed to the receiver by subjecting the receiver to a combination of heat and pressure.

In an inkjet print engine, droplets of ink are deposited onto the receiver directly in an image-wise pattern and allowed to dry. In both electrophotographic and inkjet printing, color prints are produced by printing separations, in register, comprising the subtractive primary colors cyan, magenta, yellow, and black. In addition, custom colors can also be printed using specialty inks such as those containing fluorescent, metallic, magnetic, low optical density or light colorant, or custom spot colors.

It should be noted that the terms "in-track" and "cross-track" are frequently used in digital printing. Those terms refer to the process direction, with "in-track" referring to the direction in which the printer runs and "cross-track" refers to the direction perpendicular to the running direction of the print engine. Accordingly, the in-track and cross-track directions are independent of the X and Y directions defined earlier.

Figure 6:
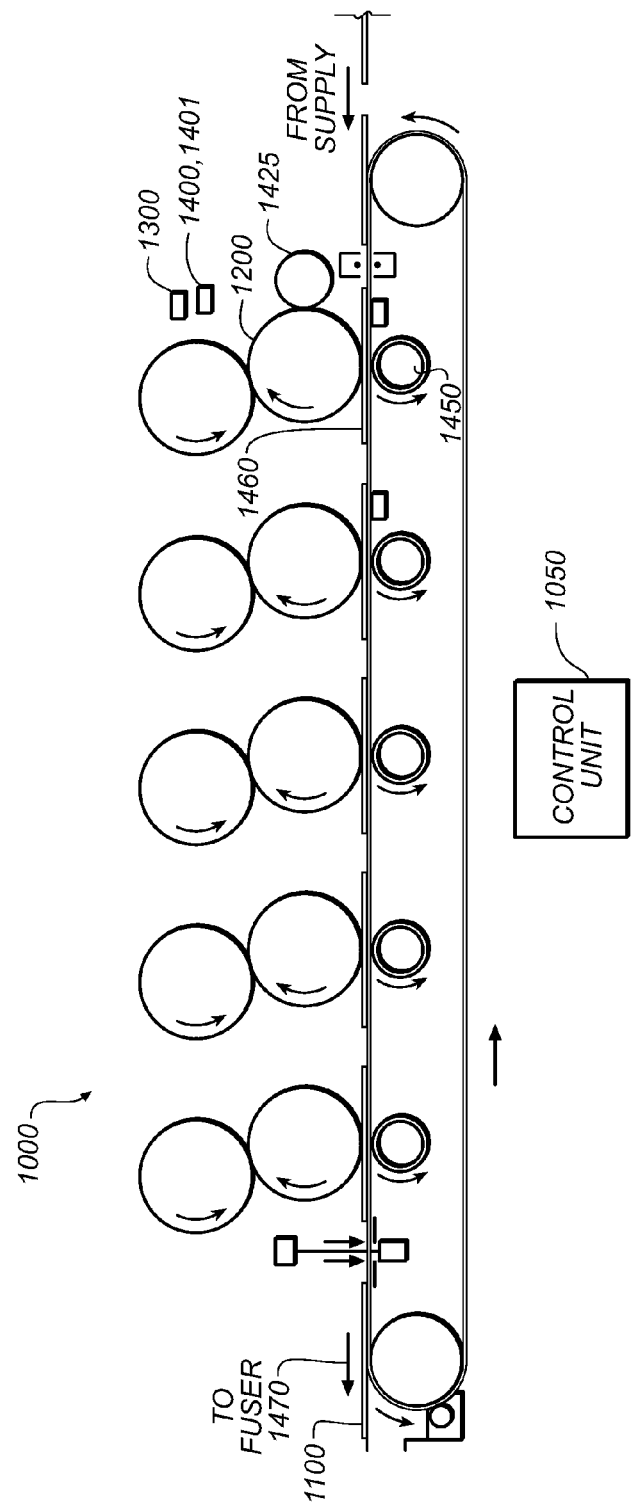
FIG. 6 shows an electrophotographic print engine.

In a typical print engine, shown in FIG. 6, the speed at which the pixels that comprise the electrostatic latent image are formed or the rate that ink droplets are jetted onto a receiver are synchronized with the process speed of the print engine so that images are printed on a receiver without an undesirable skew. This process is often referred to as "writing." Moreover, the commencement of the writing process is timed so that writing and the eventual position of a sheet of receiver or a particular frame or area of a receiver in roll form is timed so that the image is printed at the correct location of the receiver. When color prints are made, each color must be correctly timed so that all colors are printed in register on the receiver.

Figure 5:
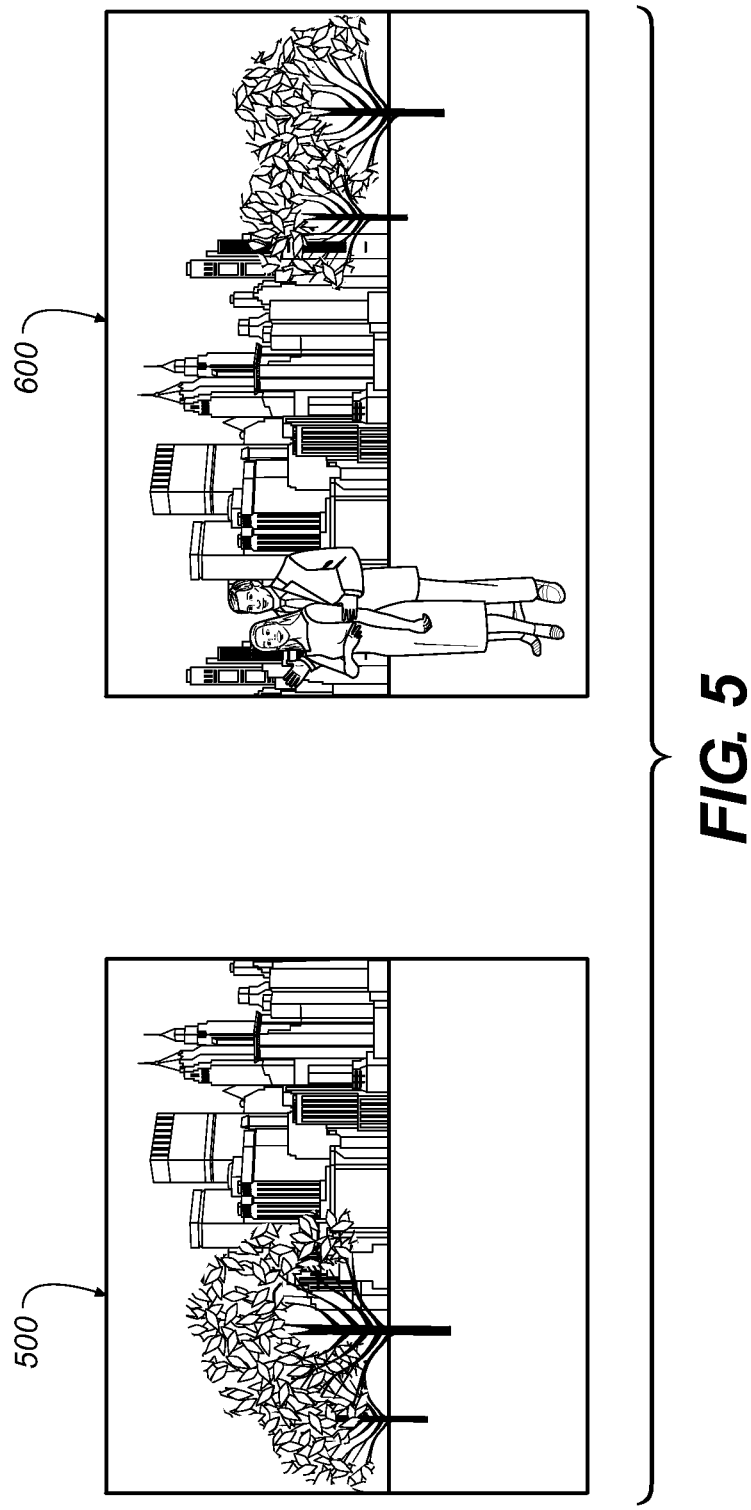
FIG. 5 shows views which will be printed abutting each other.

This is not the case when practicing the present invention. Color to color registration must still be timed so that all colors are deposited on a given sheet of receiver or a portion of a receiver in register. However, as the printed views must properly abut, see FIG. 5, the timing must be corrected to adjust for the required rotation and translation of the print 600 corresponding to view 200 so that print 600 properly abuts properly to print 500 corresponding to view 100, i.e. the overlap regions if printed must be congruent. To achieve this, the timing of the writer is adjusted so that the electrostatic latent image or ink droplets are written at a rate so the angle of the writing is adjusted by the process speed of the printer, i.e. the speed at which the primary imaging member in an electrophotographic printer or the transport rate of the receiver in an inkjet printer, adjusts the writing rate so that the printed information corresponding to vectors 175 and 275 are parallel. Moreover, the timing of the writing is adjusted to that the printed information that would result from printing the pixels corresponding to vectors 175 and 275 are superimposed. It should be noted that, in general, it is necessary to print only one of the two overlap regions. Correct practicing of this invention would be determined if the print corresponding to view 100 properly and smoothly abuts to the printed corresponding to view 200 so that the transition from one view to the other is continuous.

Prints 500 and 600 can be printed on a single piece of receiver. Alternatively, prints 500 and 600 can be produced on separate sheets of receiver. Alternatively, the receiver size need not be commensurate with the print size. For example, it may require three sheets of a receiver to fully print prints 500 and 600. In addition, prints 500 and 600 may abut in either the X or Y-directions and the corresponding printed panoramic print may correspond to more than two views and may extend in both the X and Y directions.

It may be desirable to actually determine an angle of rotation required to make the second vector parallel to the first vector. It may also be desirable to determine a density of the first overlap region and adjust a density of the combined first and second overlap region to match the density of the first overlap region. This would ensure that the overlap region does not appear to have a higher density than to adjoining regions.

It may be desirable to adjust the contrast of the second digital file to match the contrast of the first digital file. This can be accomplished by determining a point of highest density in the first vector; determining a point of lowest density in the first vector; determining a point of highest density in the second vector; determining a point of lowest density in the second vector; determining a first scale factor to make the highest density in the second vector match the highest density in the first vector; determining a second scale factor to make the lowest density in the second vector match the lowest density in the first vector; determining a linear density correction using the first and second scale factor; and applying the linear density correction to each pixel in the second image.

It may also be desirable to match the density of the second digital file to that of the first digital file. This can be accomplished by determining an average density of the first vector; determining an average density of the second vector; determining a scale factor to make the average density of the second vector match the average density of the first vector; and applying the scale factor to each pixel in the second image.

Combining digital files to produce a panoramic image is suitable for electronic display of the panoramic image. Alternatively, the combined digital file can be used to produce a panoramic print using a digital printer such as an electrophotographic or inkjet printer. However, panoramic prints can also be made using separate digital files, from views that have been captured as described above in this disclosure.

In a digital print engine such as an electrophotographic print engine 1000, shown in FIG. 6, digital files representing a print are converted into a print 1100 using a control unit 1050 that operates the print engine. A primary imaging member 1200 such as a photoreceptor is uniformly charged using a charging unit 1300 such as a grid controlled corona charger or a roller charger as the primary imaging member (PIM) is transported in the process or X-direction through the print engine at a process speed V. An electrostatic latent image is then formed by image-wise exposing, pixel by pixel, the PIM using a writer such as an LED array 1400 or laser scanner 1401. The exposure rate of the LED array or laser scanner is adjusted to compensate for the process speed so that the printed file would be properly aligned on the PIM.

The electrostatic latent image is converted into a visible image by bringing the PIM into operative proximity to a development station 1425 that contains marking or toner particles that are deposited onto the PIM according to the degree of exposure of the pixels. The toner-bearing PIM is then transported into operative proximity to a transfer system 1450 where a receiver 1460 is pressed into contact with the PIM and the toner image is transferred to the receiver 1460 such as paper. The receiver 1460 is then transported into a fixing system 1470 such as a fuser, where heat and pressure permanently fix the image to the receiver. The writer speed in the cross track or Y-direction is controlled so that the print is properly aligned on the receiver.

Figure 7:
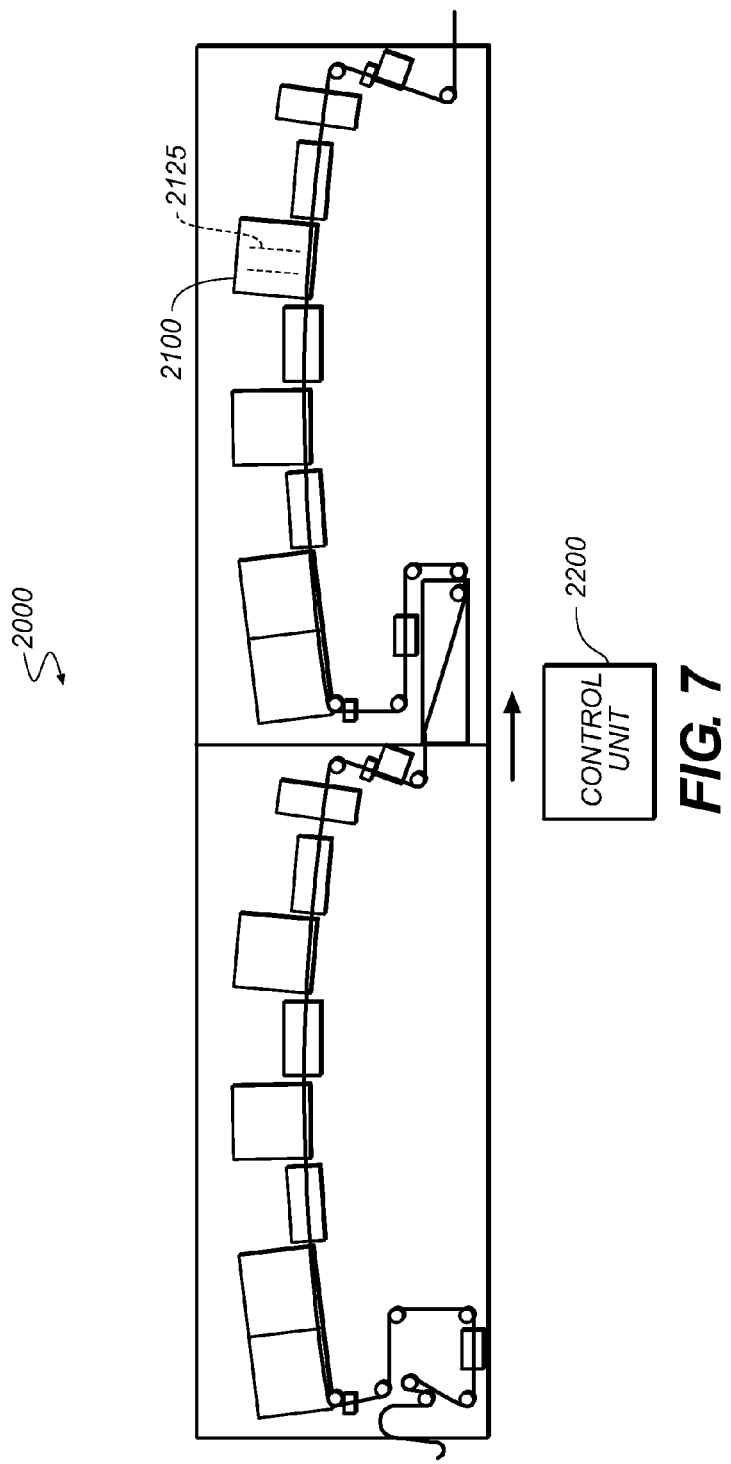
FIG. 7 shows an inkjet print engine.

Alternatively, electronic files can be converted into prints using an inkjet printer 2000, shown in FIG. 7. Here, a jetting head 2100 comprises a series of jetting nozzles 2125 that jet ink, pixel by pixel, in response to a signal from a control unit 2200 onto a receiver such as paper, as the receiver is being transported in the process or X-direction. The jetting nozzle jetting rate is controlled to properly align the print on the receiver according to the process speed. In addition, jetting heads are seldom wide enough to totally cover a receiver. Either multiple heads are aligned in an inkjet engine to allow jetting in the cross track or Y-direction or the jetting heads are driven in the cross track direction at a speed to compensate for the transport speed of the receiver so that the print is properly aligned on the receiver.

A combined electronic or digital file, made using the process described previously, can be used to produce a panoramic print. However, it may be necessary or desirable to produce a panoramic print from a plurality of abutting files without combining them. This embodiment describes a process and apparatus for producing a panoramic print from files capturing abutting views without first combining the files into a single file representing the panoramic scene.

Two electronic files containing data that can be used to make a panoramic print from abutting views can be printed as a panoramic print without first combining and correcting the files by first capturing the data using a digital camera 20. Each digital file 100, 200 should contain a an overlap region 115, 215 corresponding to an overlap region 50 of the views or scenes 30, 40 that have been captured so that the abutting portions or edges 51, 52 of the files would contain information common to both scenes.

Two points 150, 250 are identified in each of the two overlap regions 115, 215 that should correspond to each other. Information such as density or color information is extracted from the points. If the information is not the same, a new set of points in at least one of the files such as the second file containing the second overlap region, is chosen. The process is repeated until two sets of points, one in each overlap region, are found to contain the same information. Vectors 175, 275 are drawn in each overlap region connecting the set of points. The vectors should cover portions of each overlap region containing sufficiently diverse information so that, upon extraction of information from a plurality of points along each vector, a comparison of the information can be made to ensure that the regions within the vectors correspond to each other. This is to allow the overlap regions to be properly superimposed when printing the files to produce a panoramic print. Corresponding information is extracted from the pixels along the two vectors to allow comparison of the regions to ensure that the chosen regions do, indeed, correspond to the same portion of the scenes or views. If they do not, the process is repeated, starting at the selection of points in at least one of the views.

In order to properly join the two scenes or views to produce a panoramic print, the prints must be brought into corresponding orientation to correct for angular mismatch caused by rotating the camera, translational positioning to properly superimpose the second view onto the first, correcting for density and contrast variations between the information in the second digital file and the first, and correcting for magnification differences.

The angle between the vectors or direction angle 300 in the first and the second overlap regions 115, 215, relative to the X- or Y-direction, is determined and, using that information, a correction angle necessary to rotate the vector in the second overlap region to make it parallel to the vector in the first overlap region is determined. The vector in the second overlap region is rotated by the correction angle to generate a rotated vector 276 by rotating the entire second digital file by the correction angle. This allows the two scenes to be parallel.

The rotation is accomplished by adjusting the writing speed of the digital print engine so that the writing rate is corrected by the in-track process speed so that the vectors would be parallel, as would be the printed versions of the two digital files. To correct the angle in an inkjet printer, a control unit 1050 adjusts the jetting rate so that the correct angle of printing is achieved. This can be done by adjusting the rate at which ink is jetted from sequential nozzles 2125 contained within the jetting head 2100 in the Y-direction or, if the head containing the nozzles translates in the Y-direction during the course of printing to allow the receiver to be printed, the speed at which the head is translated can be adjusted. For an electrophotographic print engine, a control unit 1050 adjusts the rate that the LED array 1400 or laser scanner 1401 exposes pixels on the primary imaging member 1200.

Magnification of the first and second digital file can differ, resulting in a mismatch of sizes of the two views when combined into a panoramic print. This is corrected by determining the lengths of the vectors 175, 275 in the first and second overlap regions and by adjusting the length of the vector in the second overlap region 275 so that it is the same length as the vector in the first overlap region 175. This is done by varying the number of pixels printed in the second overlap region so that the vectors would be the same length. It should be noted that the vectors, themselves, need not be printed. Rather, the information contained in the region within the length of the vector is printed. The pixels that are printed is controlled by the writer. In an electrophotographic print engine, the LED array 1400 or laser scanner 1401 exposes those pixels to form an electrostatic latent image on the primary imaging member 1200 so that the corresponding lengths are the same. In an inkjet print engine, ink is jetted from the jetting nozzles so that the appropriate pixels are printed along the vector.

Density differences cause by variations in lighting or exposure or other artifacts such as scene content adjustments with automatically adjusting cameras, are adjusted by first determining an average print density along the vector. This can be accomplished by comparing the density information, pixel by pixel, along the length of the vector. The printer control unit 1050 then adjusts the average density of the second print to match that of the first. This is done by uniformly depositing more or less ink in the second scene. In an electrophotographic print engine 1000, this can be done by either shifting the exposure of the primary imaging member 1200 when creating the electrostatic latent image or by adjusting the bias applied to the development station 1425 when printing the second view. In an inkjet print engine 2000, this result is achieved by jetting more or less ink to uniformly shift the density of the print.

Contrast between the first and second views is adjusted by determining, along each of the two vectors, points of varying density, such as a high density and a low density pixel, corresponding to at least two corresponding points on each of the two vectors. A relation is then defined for the densities of each of the two views and the density response of the second view is scaled to match that of the first view. In general, the mapping can be linear. However, nonlinear mappings can also be used, especially if more than two points are used or if the points on the vector are within very high or very low densities, often referred to as the toe and shoulder regions of a print.

The second digital file must now be translated in the X- and Y-directions to properly abut the first digital file when printed. This is done by adjusting the timing of the writer so that the positions of the two files correspond and the vectors, if actually printed, would overlap.

Finally, it is necessary to adjust the densities in the overlap regions so that the overlap region is not printed twice, resulting in too high a density. This can be done by simply not printing the overlap region of the second digital file. Alternatively, each overlap region could be printed at a fraction of the total density so that the final density in the overlap region matches the density determined by the digital file for the first overlap region. Alternatively, if, even after the aforementioned corrections have been applied, there are still slight density or magnification differences that might create an objectionable region in the panoramic print, the overlap regions can be feathered into the adjacent nonoverlap regions of both the first and second views so that no discernible density or size variations are noticed between the two views.

The individual views are captured using the process previously described herein. The rate that the electrostatic latent image is formed on a PIM or that ink is jetted onto a receiver, however, is adjusted to produce a print with correct alignment, magnification scaling, density and contrast corrections, and overlap, without double printing the information in the overlap region.

Figure 8:
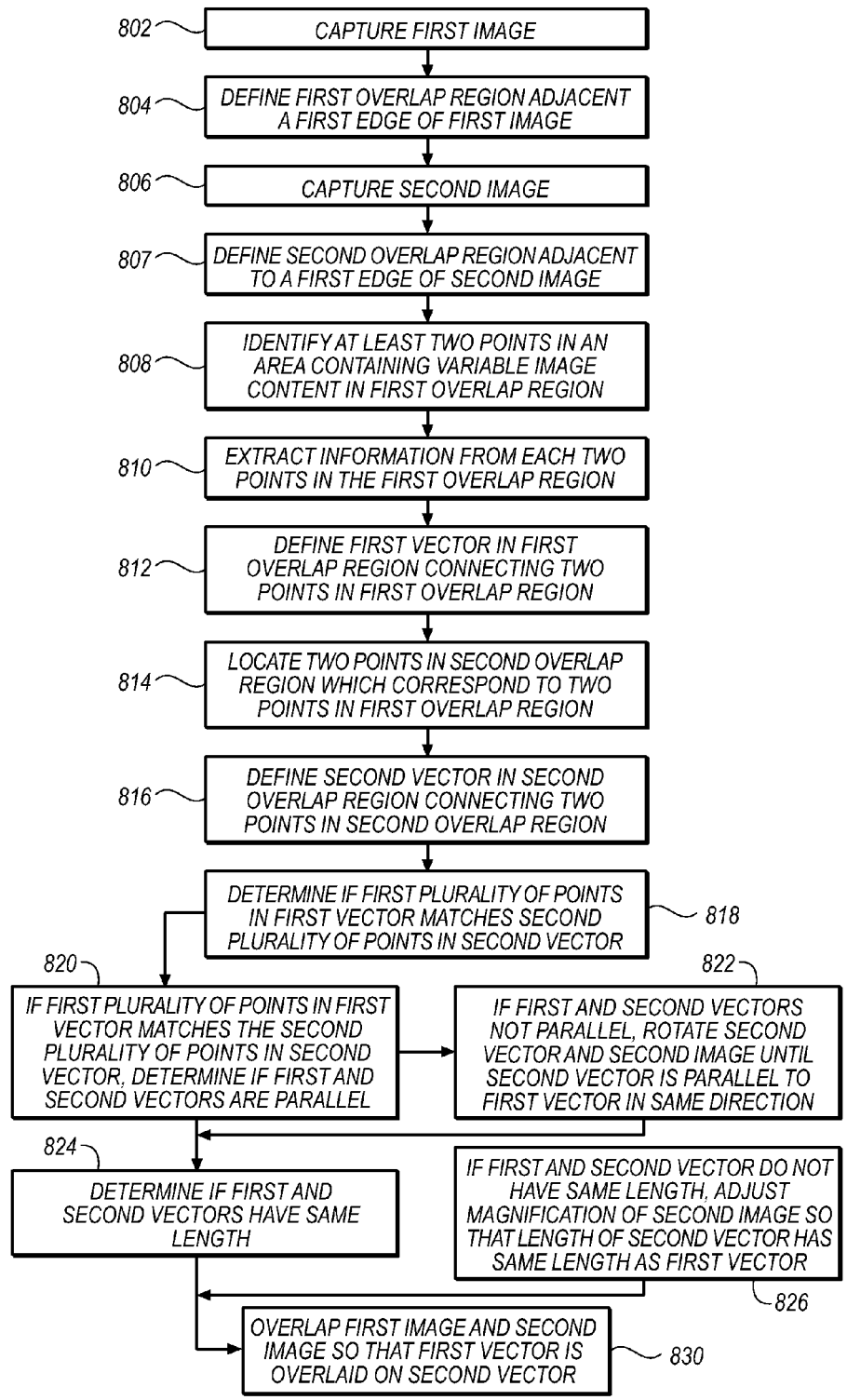
FIG. 8 shows a flow chart for practicing an embodiment of the invention.

The process, according to one embodiment of the invention, is shown in FIG. 8:

a first image is captured;
a first overlap region adjacent a first edge of the first image is defined;
a second image is captured;
a second overlap region adjacent to a first edge of the second image is defined;
at least two points in an area containing variable image content in the first overlap region are identified;
information from each of the two points in the first overlap region is extracted;
define a first vector in the first overlap region connecting the two points in the first overlap region;
locate two points in the second overlap region which correspond to the two points in the first overlap region;
define a second vector in the second overlap region connecting the two points in the second overlap region;
determine if a first plurality of points in the first vector matches a second plurality of points in the second vector;
if the first plurality of points in the first vector matches the second plurality of points in the second vector, determine if the first and second vectors are parallel;
if the first and second vectors are not parallel, determine an angle of rotation required to make the second vector parallel to the first vector.

In an alternate embodiment, a speed of an image writer is adjusted so that the first and second vector are parallel in the print and the panoramic image is printed.

The invention has been described in detail with particular reference to certain preferred embodiments thereof, but it will be understood that variations and modifications can be effected within the scope of the invention.

PARTS LIST 10 photographer
20 digital camera
30 image (view or scene)
40 image (view or scene)
50 overlap region
51 edge
52 edge
100 digital file (view)
115 overlap region
150 reference point
151 reference point 175 reference vector
200 digital file (view)
215 overlap region
250 reference point
251 reference point
275 reference vector
276 reference vector
300 direction angle
500 print
600 print
802 capture first image
804 define first overlap region adjacent first edge of first image
806 capture second image
807 define second overlap region adjacent first edge of second image
808 identify at least two points in area containing variable image content in first overlap region
810 extract information from two points in first overlap region
812 define first vector in first overlap region connecting two points in first overlap region
814 locate two points in second overlap region which correspond to two points in first overlap region
816 define second vector in second overlap region connecting two points in second overlap region
818 determine if first plurality of points in first vector matches second plurality of points in second vector
820 if first plurality of points in first vector matches second plurality of points in second vector, determine if first and second vectors parallel
822 if first and second vectors not parallel, rotate second vector and second image until second vector is parallel to first vector in same direction
824 determine if first and second vectors have same length
826 if first and second vectors do not have same length, adjust magnification of second image so length of second vector has same length as first
830 overlap first image and second image so that first vector is overlaid on second vector
1000 electrophotographic print engine
1050 control unit
1100 print
1200 primary imaging member
1300 charging unit
1400 LED array
1401 laser scanner
1425 development station
1450 transfer system
1460 receiver
1470 fixing system
2000 inkjet printer
2100 jetting head
2125 jetting nozzles
2200 control unit

The invention claimed is:

1. A method of making a panoramic print comprising:
capturing a first image;
defining a first overlap region adjacent a first edge of the first image;
capturing a second image;
defining a second overlap region adjacent to a first edge of the second image;
identifying at least two points in an area containing variable image content in the first overlap region;
extracting information from each of the two points in the first overlap region;
defining a first vector in the first overlap region connecting the two points in the first overlap region;
locating two points in the second overlap region which correspond to the two points in the first overlap region;
defining a second vector in the second overlap region connecting the two points in the second overlap region;
determining if a first plurality of points in the first vector matches a second plurality of points in the second vector;
if the first plurality of points in the first vector matches the second plurality of points in the second vector, determine if the first and second vectors are parallel;
if the first and second vectors are not parallel, determine an angle of rotation required to make the second vector parallel to the first vector;
adjusting a speed of an image writer so that the first and second vector are parallel in the print; and
printing the panoramic image.

2. A method of making a panoramic print comprising:
capturing a first image;
defining a first overlap region adjacent a first edge of the first image;
capturing a second image;
defining a second overlap region adjacent to a first edge of the second image;
identifying at least two points in an area containing variable image content in the first overlap region;
extracting information from each of the two points in the first overlap region;
defining a first vector in the first overlap region connecting the two points in the first overlap region;
locating two points in the second overlap region which correspond to the two points in the first overlap region;
defining a second vector in the second overlap region connecting the two points in the second overlap region;
determining if a first plurality of points in the first vector matches a second plurality of points in the second vector;
if the first plurality of points in the first vector matches the second plurality of points in the second vector, determine if the first and second vectors are parallel;
adjusting a timing of an image writer so that the first and second vector are superimposed in the print;
determining if the first and second vectors have the same length;
if the first and second vector do not have the same length, determine a magnification factor necessary to make the second vector the same length as the first vector;
determining a translation necessary to superimpose the second vector on the first vector;
adjusting a timing of print data to a print engine to superimpose the second vector on the first vector; and
printing the panoramic image.

3. A method of making a panoramic print comprising:
capturing a first image;
defining a first overlap region adjacent a first edge of the first image;
capturing a second image;
defining a second overlap region adjacent to a first edge of the second image;
identifying at least two points in an area containing variable image content in the first overlap region;
extracting information from each of the two points in the first overlap region;
defining a first vector in the first overlap region connecting the two points in the first overlap region;

locating two points in the second overlap region which correspond to the two points in the first overlap region;

defining a second vector in the second overlap region connecting the two points in the second overlap region;

determining if a first plurality of points in the first vector matches a second plurality of points in the second vector;

if the first plurality of points in the first vector matches the second plurality of points in the second vector, determine if the first and second vectors are parallel;

if the first and second vectors are not parallel, determine an angle of rotation required to make the second vector parallel to the first vector;

adjusting a timing and a speed of an image writer so that the first and second vector are superimposed in the print;

determining if the first and second vectors have the same length;

if the first and second vector do not have the same length, determine a magnification factor necessary to make the second vector the same length as the first vector;

determining a translation necessary to superimpose the second vector on the first vector;

adjusting a timing of print data to a print engine to superimpose the second vector on the first vector; and printing the panoramic image.

4. The method of claim 3 further comprising:

rotating the second vector and the until the second vector is parallel to the first vector and in the same direction.

5. The method of claim 3 further comprising:

adjusting a magnification of the second image so that a length of the second vector has the same length as the first vector.

6. The method of claim 3 further comprising:

overlapping the first image and the second image so that the first vector is overlaid on the second vector.

* * * * *